United States Patent [19]

Good

[11] 4,204,375
[45] May 27, 1980

[54] FRAME CONSTRUCTION FOR A DIVIDER WALL

[75] Inventor: Wayne W. Good, Sturgis, Mich.

[73] Assignee: Harter Corporation, Sturgis, Mich.

[21] Appl. No.: 863,848

[22] Filed: Dec. 23, 1977

Related U.S. Application Data

[62] Division of Ser. No. 728,383, Sep. 30, 1976, Pat. No. 4,100,709.

[51] Int. Cl.² .......................... E04H 1/00; E04B 1/00
[52] U.S. Cl. ....................... 52/239; 52/285; 52/584; 52/710; 403/262; 403/384; 403/387
[58] Field of Search ............... 52/235, 584, 285, 283, 52/710, 711, 709, 239, 284; 403/387, 384, 262, 246

[56] References Cited

U.S. PATENT DOCUMENTS

| | | | |
|---|---|---|---|
| 2,345,650 | 4/1944 | Attwood | 52/710 X |
| 2,767,609 | 10/1956 | Consino | 52/709 X |
| 2,784,812 | 3/1957 | Kindorf | 52/710 X |
| 3,031,217 | 4/1962 | Tinnerman | 403/262 X |
| 3,266,209 | 8/1966 | Zibell | 52/584 X |
| 3,304,683 | 2/1967 | Ferreira | 52/239 X |
| 3,408,665 | 11/1968 | Harris | 403/387 X |
| 3,410,588 | 11/1968 | Frye et al. | 403/387 |
| 3,429,601 | 2/1969 | Bremers | 52/476 X |
| 3,592,289 | 7/1971 | Aysta et al. | 160/351 X |
| 3,733,759 | 5/1973 | Schulte et al. | 52/239 X |
| 3,828,516 | 8/1974 | Kern | 52/656 X |
| 4,073,113 | 2/1978 | Oudot et al. | 52/710 |
| 4,074,141 | 2/1978 | Bryant | 52/584 X |

FOREIGN PATENT DOCUMENTS

| | | | |
|---|---|---|---|
| 1559002 | 9/1969 | Fed. Rep. of Germany | 403/387 |
| 6803400 | 9/1969 | Netherlands | 52/656 |
| 354238 | 6/1961 | Switzerland | 52/475 |
| 796853 | 6/1958 | United Kingdom | 403/387 |

*Primary Examiner*—Leslie Braun
*Attorney, Agent, or Firm*—Hamilton, Renner & Kenner

[57] ABSTRACT

A free-standing, prefabricated, knock down, readily assembled and disassembled, relocatable vertical wall or space divider. Such wall dividers are useful for partitioning buildings and/or office complexes. The wall is made up of a plurality of individualized and decorative flush panel units which are interchangeable and which are adapted to be readily inserted within quadrilateral openings delineated by a novel wall frame and locked into place by hidden spline members that are mounted in the wall frame for translatory movement. The wall frame is fabricated in a novel assemblage of unique components which can present either a metallic or wooden exterior finish surface. The configuration of the wall frame components provides for lateral walls to extend outwardly not only at modular locations but also from any other desired location by use of novel adapters. The panels may be removed, redecorated and replaced as needed. Shelving or other appurtenances are attachable to the hidden spline members. The entire wall panel and/or divider is readily relocatable when it is desired to re-arrange, enlarge or change a given floor space.

5 Claims, 19 Drawing Figures

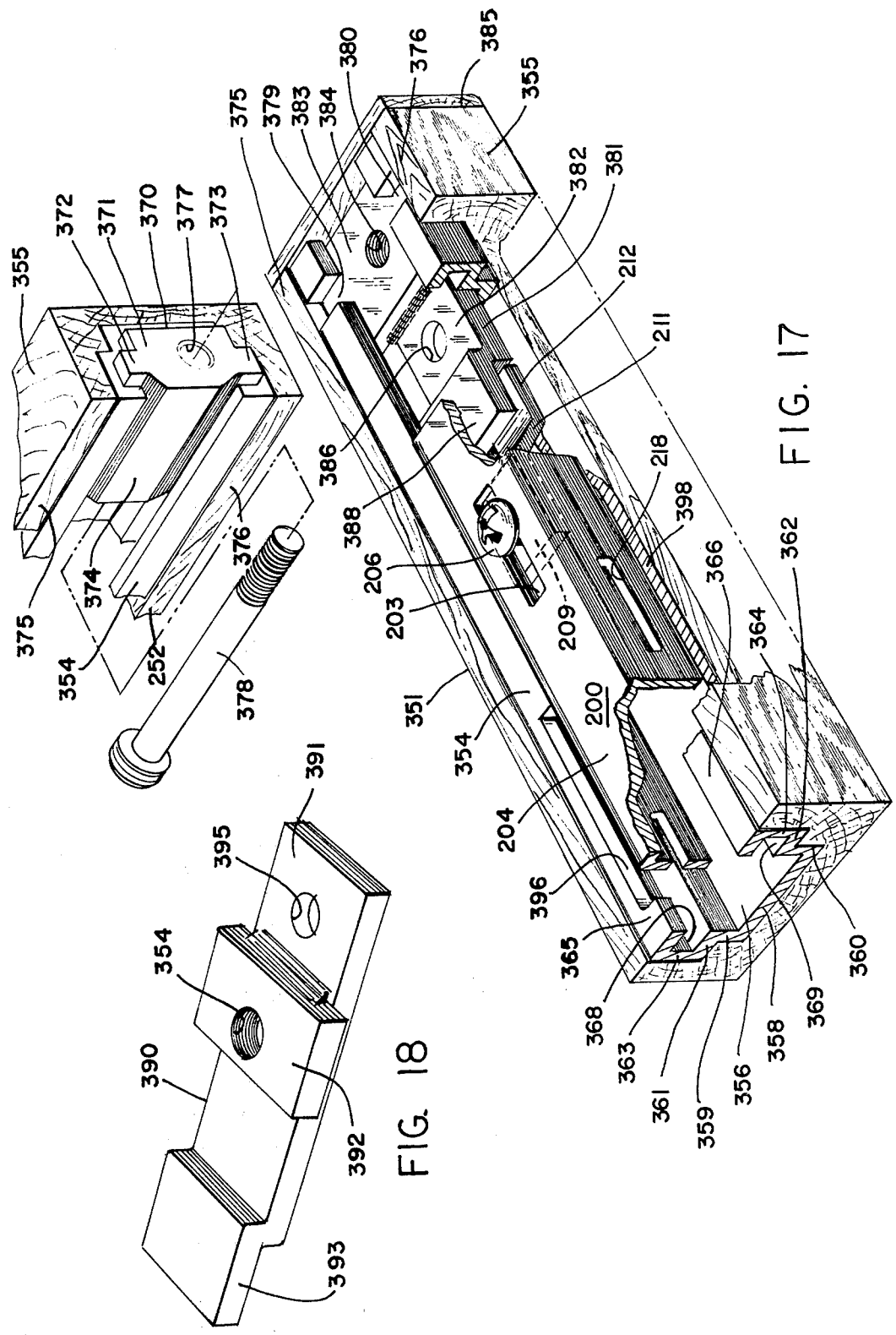

FRAME CONSTRUCTION FOR A DIVIDER WALL

This is a divisional of application Ser. No. 728,383, filed Sept. 30, 1976, now U.S. Pat. No. 4,100,709.

BACKGROUND OF THE INVENTION

This invention relates to free-standing, knock down, readily assembled and disassembled, relocatable wall panels and space dividers which are used to compartmentalize open floor areas as desired for intended functional usage. There are in the prior art many types of wall panels the appearance of which is useful in designing and arranging floor plans for buildings to meet various functional needs of offices, homes or the like.

The movable walls and dividers represented by the prior art are of such construction, however, that they are not adaptable either to quick assembly or to new and changing materials and design concepts for decorating or redecorating. In addition, the prior known wall panels are burdensome to assemble and, in some instances, do not provide sufficient separation of office functions to prevent noise or other distracting influences from the next adjacent area, and do not have the appearance of a permanent wall.

The present invention relates to improvements in the movable wall and divider art and particularly with respect to the wall frame, the components from which the wall frame is fabricated and certain unique structural adjuncts incorporated in said wall frame.

SUMMARY OF THE INVENTION

It is, therefore, an object of the present invention to provide a wall frame for a free-standing wall or space divider in which both the vertical and horizontal members thereof incorporate a standarized structural component.

It is another object of the present invention to provide a wall frame, as above, in which the standardized structural component common to both vertical and horizontal members is readily adapted for interconnection along a common axis or at right angles with respect to each other.

It is still another object of the present invention to provide a wall frame, as above, in which unique connector members cooperatively interengage the structural components to effect a secure, but selectively releasable, connection therebetween.

It is yet another object of the present invention to provide a wall frame, as above, to which a vertically oriented spline may be conveniently attached for translation laterally of itself within the plane of that portion of the frame to which it is secured.

It is a further object of the present invention to provide a wall frame, as above, in which that connector member employed at the top of the vertically oriented component may be in the form of a plug to accomplish three objectives—viz., to provide a finished end surface at the uppermost terminus of the vertically oriented component; to provide an anchor means to which a horizontal component may be releasably secured; and, to provide a means by which to restrict movement, to a predetermined degree, of the spline member associated with the vertically oriented member in which the connector plug is received.

It is a still further object of the present invention to provide a wall frame, as above, the components of which may be uniquely interconnected with provision for lateral walls which may emanate not only from the modular junctions in a reference run of such a wall but also from any desired location therealong.

It is an even further object of the present invention to provide a wall frame, as above, the concept of which permits the exterior finish thereof to be either metallic or wooden.

These and other objects, as well as the advantages thereof over existing and prior art forms, will be apparent in view of the following detailed description of the attached drawings and are accomplished by means hereinafter described and claimed.

In general, the frame for a free-standing wall or divider embodying the concept of the present invention employs a plurality of structural components of at least substantially identical cross-sectional configuration. These components are disposed vertically as the support members and are disposed horizontally as the vertically spaced, top and lower members.

The cross section of the structural component is of generally C-shaped configuration and has a web, parallel side walls extending outwardly from the web and terminating in opposed flanges. A series of ribs extending longitudinally within the otherwise hollow C-shaped cross section of the structural component divides the interior thereof into generally three longitudinal areas—viz., the ribs contribute to the formation of the four corners of a rectangular guideway and the side walls, in conjunction with the ribs in closest proximity thereto, define cavities, one on each lateral side of the guideway.

An anchor is receivable within the guideway and may be fixedly secured thereto. In order to effect a releasable connection between longitudinally abutting members having the configuration of the aforementioned structural component, a nut and bolt combination may connect between the anchors in the longitudinally abutting members; proper alignment therebetween is maintained by at least one bar which extends from the lateral cavity in one member into the corresponding lateral cavity in the abutting member.

The same anchor means may also be employed in the formation of a releasable corner connection between two perpendicularly abutting members having the configuration of the aforesaid structural component. That is, the anchor is fixedly received within the guideway of the longitudinal component, and an aligning block is also preferably received therein. The aligning block presents lug means that interfit with appropriately located recesses in the vertical member. A connector plug is received in the vertical member, and a bolt may extend through the anchor and aligning block to be tightened within a threaded bore in an anchor plate presented from the connector plug.

The connector plug may also employ outrigger plates receivable within the lateral cavities of the vertical support member to stabilize the disposition of the connector plug therein, and when the connector plug is employed at the top of a vertical support member, a cover cap is also presented from the connector plug to impart a finished surface to the top of the vertical support member.

By locating the horizontally disposed lower member a predetermined distance upwardly of the surface on which the vertical support members rest, a leveling means may be secured thereto. The leveling means is carried on stanchions secured beneath the lower member. A unique interconnection is provided between the stanchions and a cover plate on each side of the wall to facilitate mounting and de-mounting of the cover plate and at the same time provide a passageway parallel to the cover plate within which utility lines can be received.

A series of unique connecting brackets are employed which allow wall frames embodying the concept of the present invention to be interconnected at any desired location, and at least one such bracket also permits connection at selected angles.

The present wall construction provides one or more quadrilateral openings into which one or more panel members may be received, and the panel member may be releasably secured by vertically oriented members which are movable selectively to be receivable in grooves along the vertical edge of the panel members. The configuration of the structural component employed in the present invention permits the use of a unique slide guide assembly to which vertically oriented splines can be secured for lateral translation—the slide guide assembly being separable along a median plane into laterally juxtaposed slide blocks that are mounted for movement along the flanges of the C-shaped structural component comprising the horizontally disposed members.

The concept of the present invention also contemplates that the structural component itself present the exterior finish surface of the frame or may be adapted, in an alternative arrangement, to present a wooden fascia.

Accordingly, one preferred, and an alternative, embodiment of the structural component employed by the concept of the present invention to provide the basic frame members for a free-standing wall or divider, together with various adjuncts to that frame, are shown by way of example in the accompanying drawings and described in detail without attempting to show all of the various forms and modifications in which the invention might be embodied; the scope of the invention being measured by the appended claims and not by the details of the specification.

DESCRIPTION OF THE DRAWINGS

FIG. 17 is a perspective, partly broken away and partially exploded, of a perpendicularly abutting connection between a vertical support member and a longitudinally disposed top member both of which embody an alternative construction for the structural component which is, in turn, provided with a decorative wooden fascia;

FIG. 18 is a perspective of a connector plug employed with the embodiment of the structural component represented in FIG. 17, said connector plug being particularly adapted for the connection of a lower, longitudinally disposed member to a vertical support member; and, FIG. 19 is a vertical section, of reduced scale and partially exploded, depicting the interrelationship of the top and lower horizontally disposed members to a vertical support member and depicting the relationship of the spline to the vertical support member, the retracted position of said spline represented in solid line and the protracted position in chain line.

DESCRIPTION OF THE PREFERRED EMBODIMENT

Figure 1:
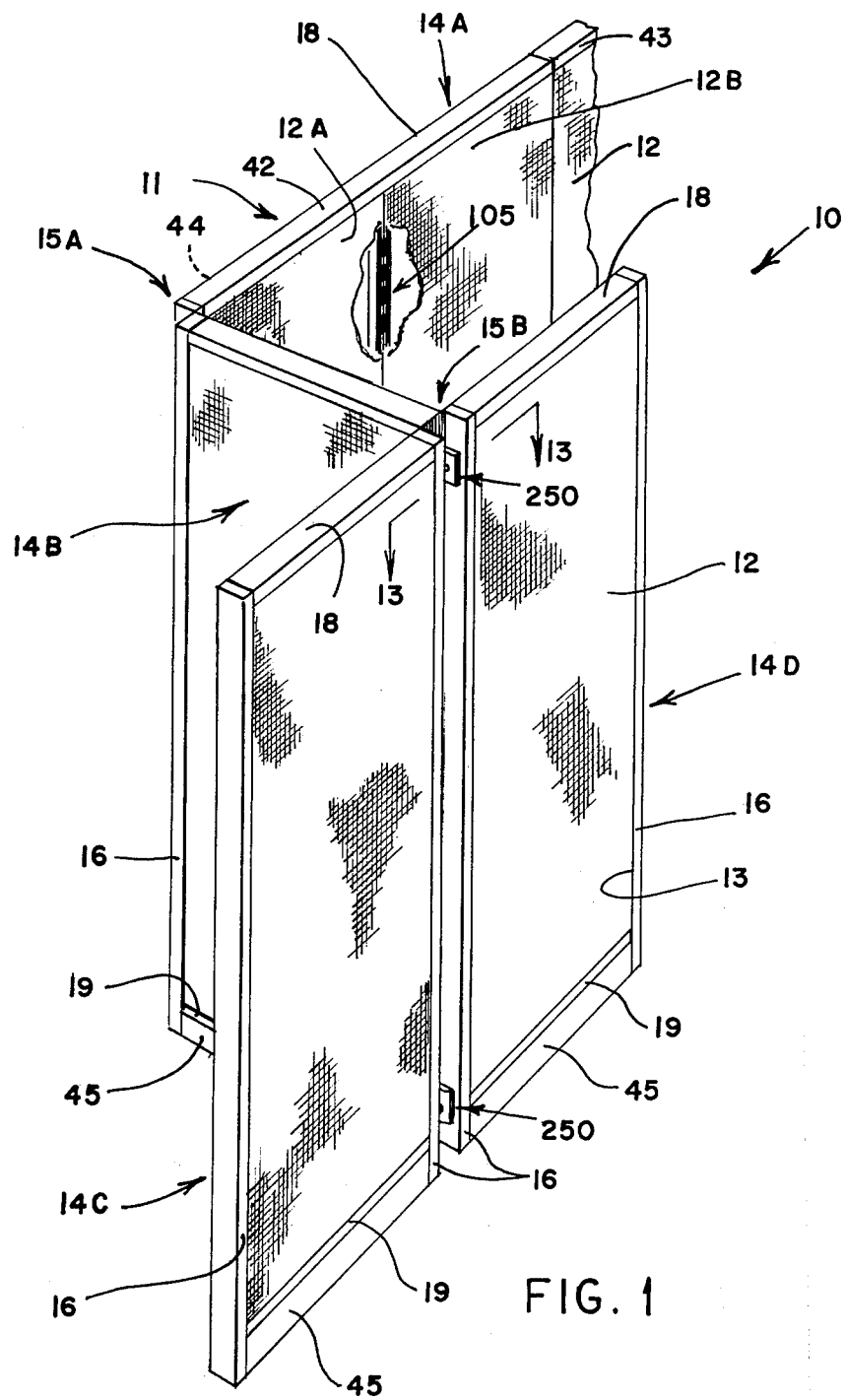
FIG. 1 is a schematic perspective of a free-standing, vertical, divider wall embodying the concept of the present invention and depicting exemplary, interconnected runs thereof.

A free-standing, vertical divider wall, indicated generally by the numeral 10 in the attached drawings and depicted schematically in FIG. 1, is useful in compartmentalizing areas within buildings to form rooms, offices, work areas, or the like. The structure of the wall 10 incorporates a frame 11 which presents one or more quadrilateral openings, or panel receiving loci, 13 into which one or more panel members 12 are received and releasably secured, as hereinafter more fully discussed.

The wall 10 may be assembled with any number of interconnected runs. A simplistic example is represented in FIG. 1 where a basic run 14A terminates in a lateral run 14B (to form a two-way corner) that itself terminates in opposed lateral runs 14C and 14D (to form a three-way corner). The example depicted in FIG. 1 employs lateral runs which extend outwardly at right angles from modular junctions 15A and 15B, but as will hereinafter be explained, the lateral runs may also extend outwardly from any desired location between the modular junctions or may extend outwardly at angles other than 90°.

In any event, the frame 11 generally comprises a plurality of horizontally spaced, vertical support members 16, horizontally oriented upper, or top, members 18 and horizontally oriented lower members 19 spaced vertically downwardly of the top members 18.

Figure 2:
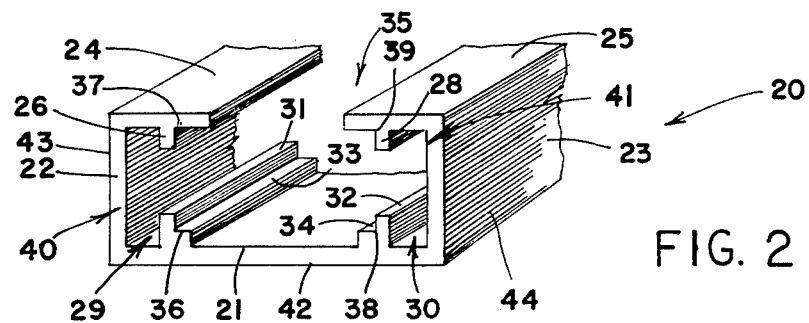
FIG. 2 is a perspective view of the preferred structural component from which the horizontal and vertical frame members in a wall embodying the concept of the present invention may be made.

According to the concept of the present invention the vertically, as well as the horizontally, oriented members preferably employ a structural component 20 of common configuration. The cross section of a preferred embodiment for that structural component is best depicted in FIG. 2 and, as can be observed, is particularly well adapted to be extruded.

Specifically, the structural component 20 is of generally C-shaped outer cross section which has a web 21. Parallel side walls 22 and 23 extend outwardly from the horizontal edges of the web 21 and terminate, respectively, in opposed flanges 24 and 25. A rib 26 extends longitudinally along, and is directed inwardly of—i.e., inwardly of the C-shaped cross section and therefore toward the web 21—the medial portion of flange 24, and, because the structural component 20 is preferably symmetrical, a corresponding rib 28 extends longitudinally along, and is directed inwardly of, flange 25.

A pair of parallel, stepped ribs 29 and 30 are disposed to extend longitudinally along the web 21 and are directed inwardly such that the summit portions 31 and 32 on each are opposedly aligned with the correspondingly opposed ribs 26 and 28. The ledge portions 33 and 34 of the respective stepped ribs 29 and 30 lie in opposition to each other. As such, a rectangular guideway 35 is formed by the medial cavity delineated between corners 36, 37, 38 and 39. Corner 36 is that created by the intersection of the summit portion 31 with ledge portion 33; corner 37 is that created by the opposed intersection of rib 26 with flange 24; corner 38 is that created by the intersection of summit portion 32 with ledge portion 34; and, corner 39 is that created by the opposed intersection of rib 28 with flange 25.

In addition to the medial cavity which forms guideway 35, the series of longitudinal ribs 26, 28, 29 and 30 heretofore detailed also contribute to the formation of rectangular, lateral cavities 40 and 41 which extend longitudinally along the respective side walls 22 and 23. Specifically, the cavities 40 and 41 are laterally bounded by the corresponding side walls and the ribs in closest proximity thereto—i.e., cavity 40 is laterally bounded by side wall 22 and ribs 26 and 29 while cavity 41 is laterally bounded by side wall 23 and ribs 28 and 30.

As seen in FIGS. 1 and 2, the outer surface 42 on web 21 as well as the outer surfaces 43 and 44 on parallel side walls 22 and 23 present the finished exterior of the frame 11. Only the outer surface 42 on web 21 of the horizontally oriented lower members 19 will be hidden from view by the hereinafter described base assembly 45.

Figure 3:
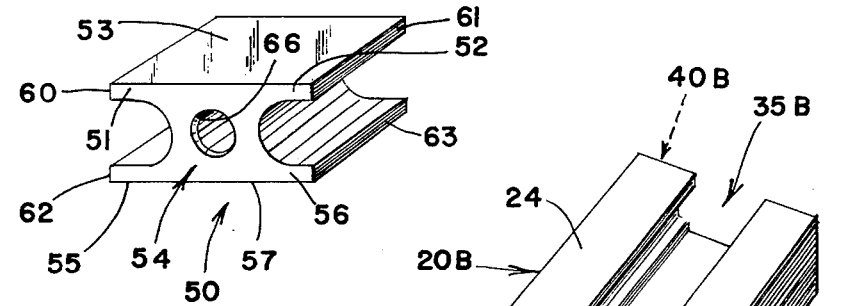
FIG. 3 is a perspective of an anchor employed in making connections between structural components of the type depicted in FIG. 2 oriented as either longitudinally abutting, or perpendicularly abutting, members.

Interconnection of the structural members 20 is facilitated by the use of an anchor 50 which, as best seen in FIG. 3, has a generally H-shaped cross section. Specifically, two legs 51 and 52 extend outwardly in a plane common to one surface 53 of the central body portion 54, and two legs 55 and 56 extend outwardly in a plane common to the opposite surface 57 of the central body portion 54.

The anchor 50 is receivable within, and selectively positionable along, the guideway 35—the distal edge 60 along leg 51 engaging one of the surfaces which intersect to define corner 37; the distal edge 61 along leg 52 engaging one of the surfaces which intersect to define corner 39; the distal edge 62 along leg 55 engaging one of the surfaces which intersect to define corner 36; and, the distal edge 63 along leg 56 engaging one of the surfaces which intersect to define corner 38.

Figure 4:
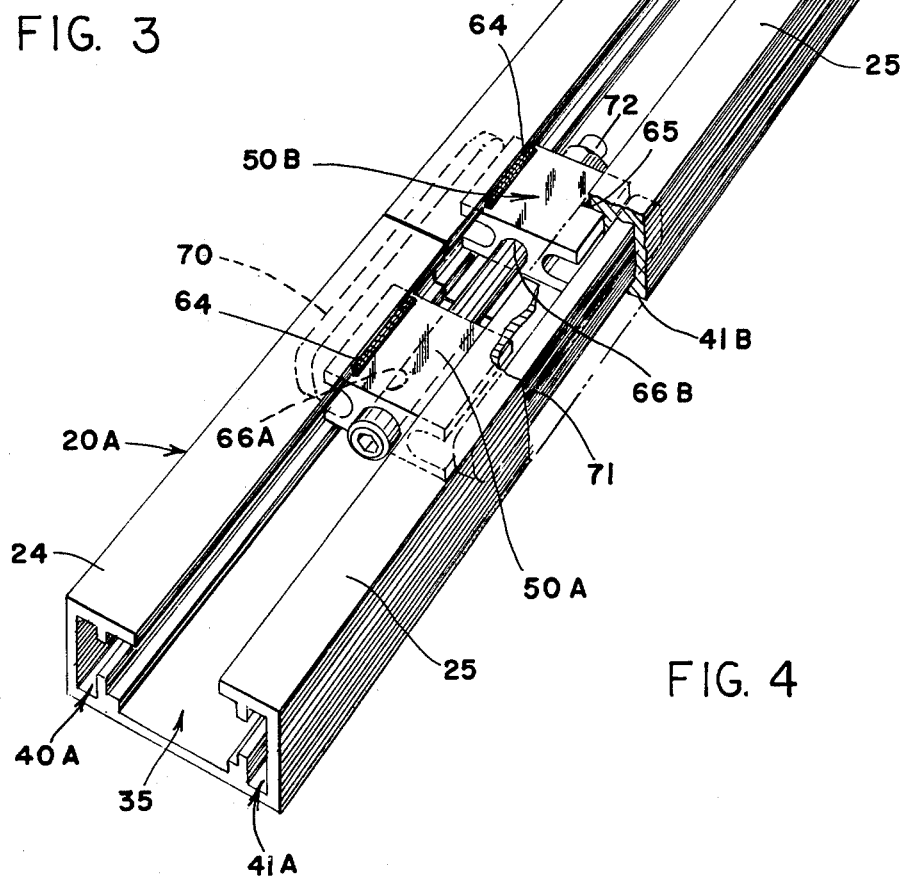
FIG. 4 is a perspective view, at slightly reduced scale, depicting a releasable connection between longitudinally abutting frame members.

After being positioned at predetermined locations within the guideways 35A and 35B, as shown in FIG. 4, the anchors 50A and 50B are fixedly secured to the structural components 20A and 20B, as by spot welds 64 and 65 between the opposed flanges 24 and 25 and the anchors 50.

It will be noted that a bore 66 extends completely through the central body portion 54 of connector 50 and is oriented parallel to the longitudinal extent of the guideway 35 within which it is received.

In order to fasten two lengths 20A and 20B of the structural component 20 end-to-end along a common axis, as represented in FIG. 4, approximately one-half of an aligning bar 70 is received within cavity 40A of length 20A and the remaining half is received within corresponding cavity 40B of length 20B. Approximately one-half of a similar aligning bar 71 is received within cavity 41A in length 20A and the remaining half is received within a corresponding cavity 41B in length 20B. A nut and bolt combination 72 is received through bore 66A in anchor 50A and registered bore 66B in anchor 50B. When the nut and bolt combination 72 is tightened the axially abutting lengths 20A and 20B of structural component 20 are rigidly secured.

Figure 5:
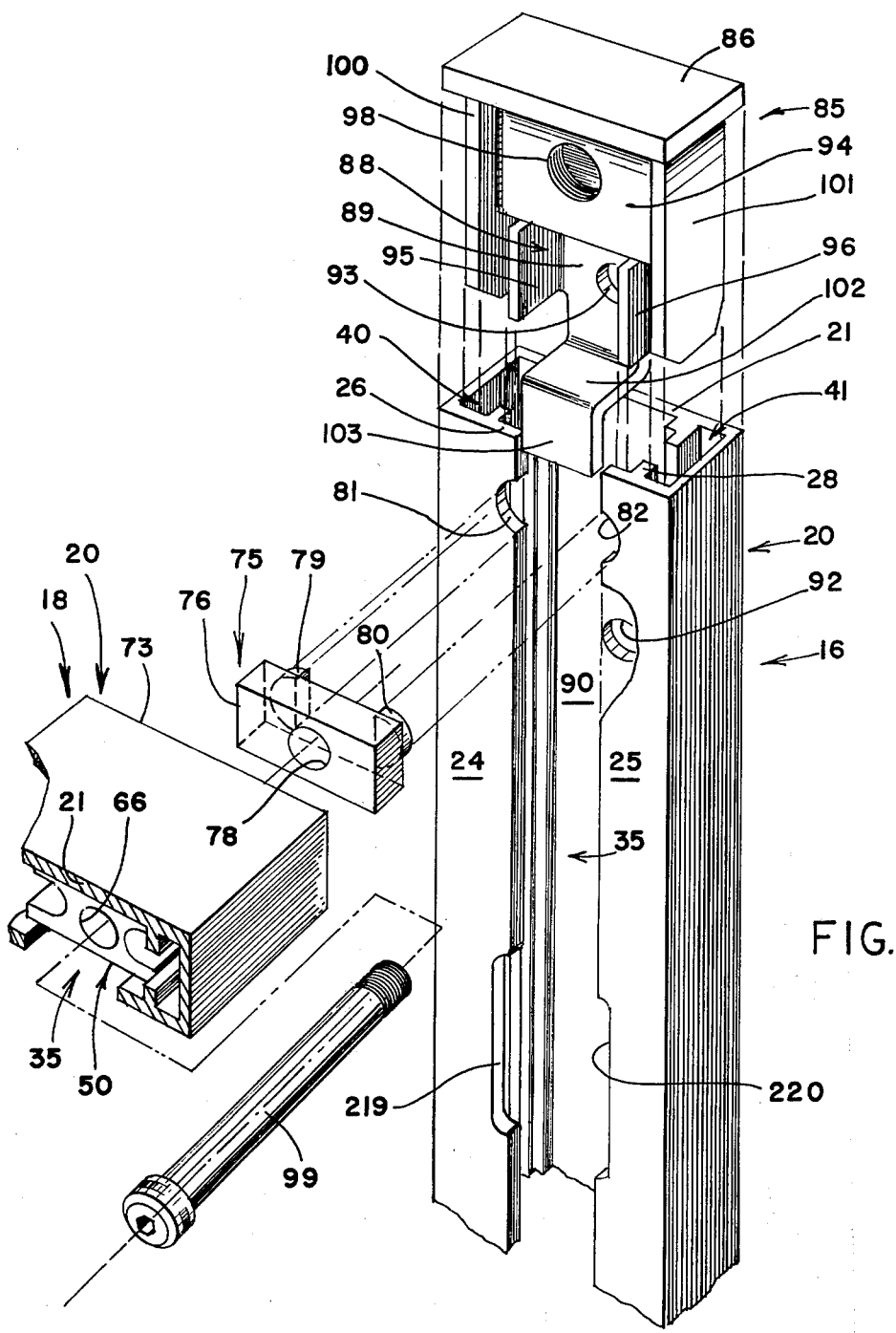
FIG. 5 is an exploded perspective of a releasable connection between perpendicularly abutting frame members, and particularly a connection between a top member and a vertical support member.
Figure 6:
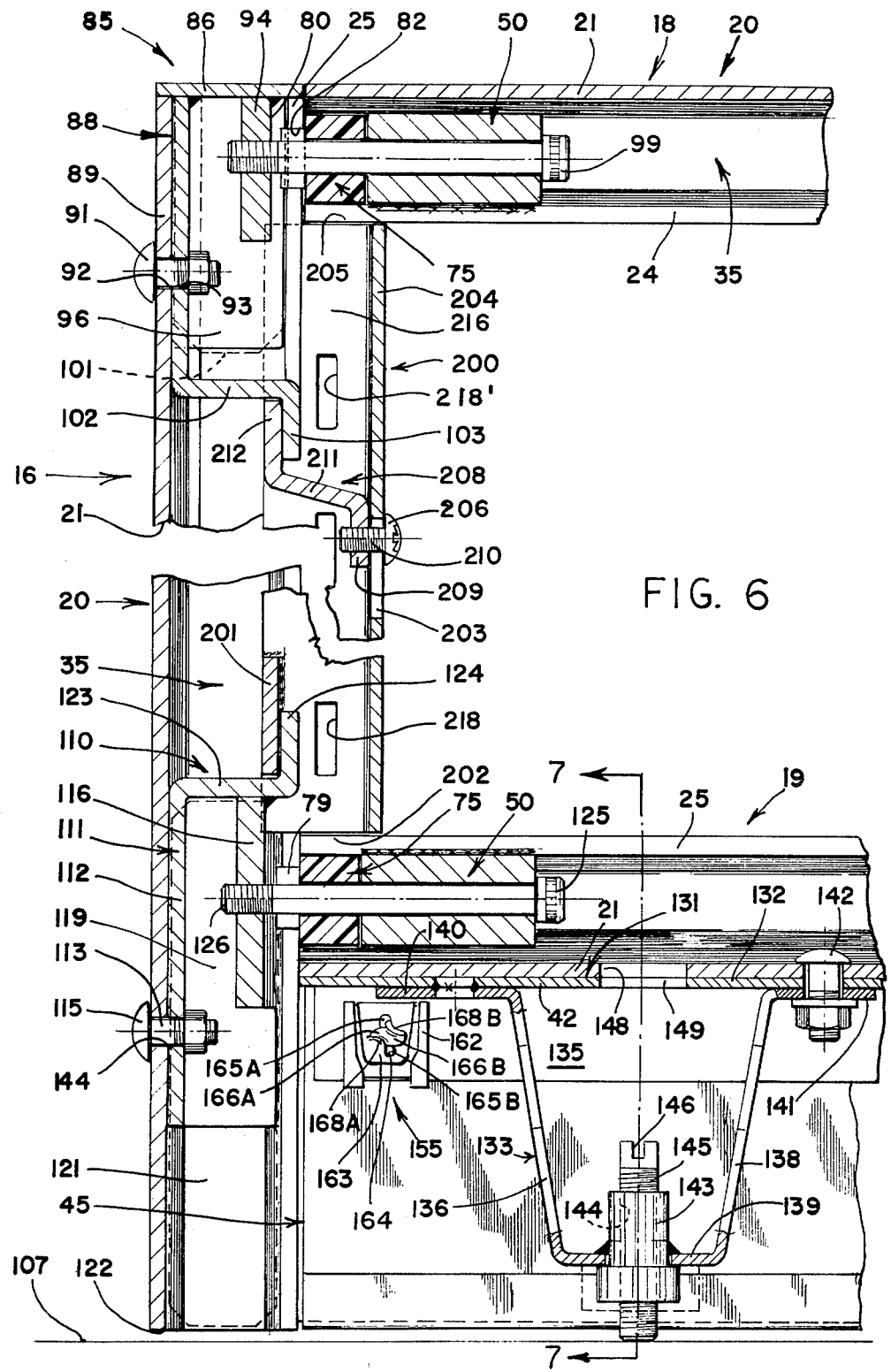
FIG. 6 is a vertical section through a wall frame embodying the concept of the present invention which depicts not only the perpendicularly abutting connection between a vertical support member and a horizontally disposed top member but also the perpendicularly abutting connection between the support member and a lower member as well as the leveling mechanism supported from said lower member.

The structural details by which components 20 may be joined at right angles to provide a top corner is best represented in FIGS. 5 and 6. Here, too, an anchor 50 is secured within the guideway 35 of top member 18 a selective distance from the transverse edge 73 thereof.

An aligning block 75 is also employed in this corner connection. The aligning block comprises a body portion 76 in the geometric configuration of an equiangular parallelepiped that fits snugly, but readily removably, within the guideway 35 in that space provided between the anchor 50 and the transverse edge 73 when the anchor is fixedly secured within the guideway 35. A bore 78, which registers with the bore 66 through anchor 50, extends through the body portion 76.

With the base surface 77 of aligning block 75 seated against the anchor 50, a pair of lugs 79 and 80 which are preferably of semicylindrical cross section extend outwardly from the body portion 76 on diametrically opposite sides of the bore 78. The lugs 79 and 80 extend longitudinally outwardly beyond the transverse edge 73 of the horizontal top member 18 to be received within semi-circular recesses 81 and 82, respectively, provided in the opposed flanges 24 and 25 of the vertical support member 16 to which the top member 18 is to be secured.

A connector plug 85 is received within the upper end portion of the vertical support member 16. The connector plug 85 has a top cap plate 86 the outer configuration of which is congruent with the outer configuration of the vertical support member 16 and affords a finished surface to the upper, transverse end thereof. The recesses 81 and 82 are located such that when the lugs 79 and 80 are received therein the cap plate 86 will lie in the same plane as the web 21 of the structural component 20 comprising the horizontally disposed top member 18.

A channel-shaped body portion 88 is secured to the top cap plate 86 and extends within the guideway 35. Rather than comport with the dimensions of the guideway 35, however, the web wall 89 of the channel-shaped body portion 88 may slidably engage the inwardly directed surface 90 on the web 21 of the structural component 20 which is incorporated in the vertical support member 16. As such, a nut and bolt combination 91 may conveniently be received through the registered bores 92 and 93 provided in the engaging web 21 and web wall 89, respectively.

An anchor plate 94 is secured to, and extends across, the flanges 95 and 96 of the channel-shaped body portion 88. The anchor plate 94 is provided with a threaded bore 98 matingly to engage the bolt 99 which extends through the registered bores 66 and 78 in the anchor 50 and aligning block 75, respectively, to secure the corner connection.

As best seen in FIG. 5, the anchor plate 94 extends transversely beyond the flanges 95 and 96 and beneath the longitudinal ribs 26 and 28.

Outrigger stabilizing plates 100 and 101 are secured to the opposite edges of the anchor plate 94 and are slidably received within the lateral cavities 40 and 41. With the web wall 89 on the connector plug 85 engaging the web 21 of the structural member 20 in which the connector plug 85 is received and with the stabilizing plates 100 and 101 engaging the respective flanges 24 and 25, the connector plug 85 will be firmly received within the structural members 20 comprising the vertical support member 16 so that the nut and bolt combination 91 (FIG. 6) need not provide any resistance against horizontal racking of the connector plug within the structural component 20.

The structure of the connector plug 85 heretofore described not only provides a finished end to the uppermost terminus of the vertical support member 16 but also presents an anchor means to which the horizontally oriented top member 18 is releasably secured. These functions could well be separated, but as can now be appreciated they can be provided by a single member with great facility.

The connector plug 85 may also provide a third function for which the appropriate structure will now be described, although the function itself is best hereinafter described in conjunction with the description of the spline members 200.

Specifically, the web wall 89 extends beyond the terminus of the flanges 95 and 96 in a Z-shaped configuration—i.e., an offset leg 102 extends transversely from the web wall 89 on the same side as the flanges 95 and 96 to present a retaining flange 103 that lies generally parallel to, but offset from, the web wall 89.

A lower connector plug 110 is quite similar to the top connector plug 85 heretofore described except that it does not present a cap plate, and it provides a spacing means by which to displace the lower member 19 sufficiently upwardly from the floor, or surface, 107, on which the wall assembly rests to accommodate the hereinafter described base assembly 45.

As can best be seen in FIG. 6, the lower connector plug 110 also has a channel-shaped body portion 111 receivable in the guideway 35 of the vertical support member 16 with the web wall 112 of the channel-shaped body portion 111 adapted slidably to engage the web 21 of the structural component 20 forming the support member 16. A bore 113 in the web wall 112 is registrable with a corresponding bore 114 in the web 21 to receive the nut and bolt combination 115.

Figure 8:
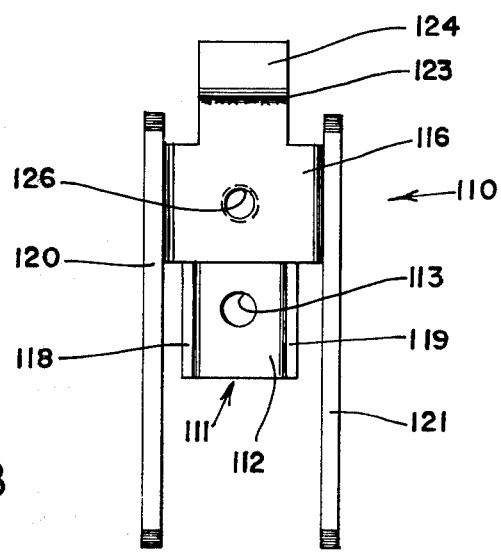
FIG. 8 is a frontal elevation of a connector plug as used in a perpendicularly abutting connection between a lower member and a vertical support member.

An anchor plate 116 is secured to the flanges 118 and 119 (FIG. 8), which extend outwardly from the web wall 112, and support the outrigger stabilizing plate 120 and 121 that are slidably receivable within the lateral cavities 40 and 41 of the standard structural component 20. As best seen in FIGS. 6 and 8, the stabilizing plates 120 and 121 may be markedly longer than the corresponding stabilizing plates 100 and 101 on the connector plug 85 in order to provide a spacing reference by which readily to locate the lower connector plug 110 upwardly from the transverse lower edge 122 of the support member 16.

A portion of the web wall 112 extends upwardly within the support member 16 beyond the anchor plate 116, and at the same time beyond the terminus of the flanges 118 and 119, in a Z-shaped configuration—i.e., an offset leg 123 extends transversely from the plane of the web wall 112 adjacent the web 21 and on the same side as the flanges 118 and 119 to present a retaining flange 124 which lies generally parallel to, but offset from, the web wall 112. As such, the retaining flange 103 on the top connector plug 85 is directly opposed to the retaining flange 124 on lower connector plug 110 for a purpose also more particularly hereinafter explained in conjunction with the description of the spline member 200.

Except for the difference in the configuration of the connector plugs, the joinder of the lower member 19 to the vertical support member 16 is otherwise identical to the joinder of the top member 18 to the vertical support member 16. As such, a bolt 125 extends through the anchor 50 and the aligning block 75 in the lower member 19 to be threadably received within the mating bore 126 in anchor plate 116. The two lugs extending from aligning block 75—of which only lug 79 is shown in FIG. 6—are received within corresponding semi-circular notches—here, too, only notch 128 is seen in FIG. 6—on the flanges 24 and 25 of the structural component 20 which comprises the vertical support member 16.

Figure 7:
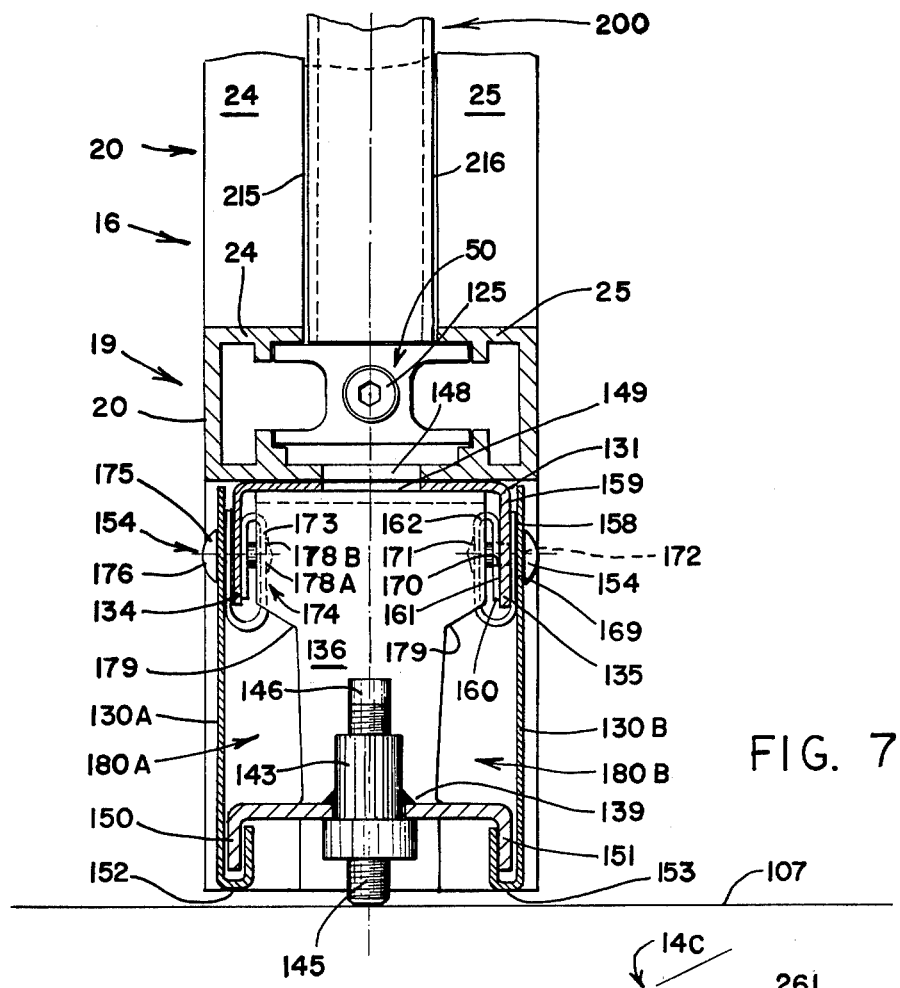
FIG. 7 is a transverse section taken substantially on line 7—7 of FIG. 6.

As can be seen in FIGS. 1, 6 and 7, the lower member 19 is spaced upwardly from the floor 107 on which the wall 10 rests, and the space therebetween, which is hidden from view by the base cover plates 130, is adapted to receive the leveling means and provide a passageway within which the utility cables can be concealed. The base assembly 45 by which this result is effected comprises a relatively thin walled channel member 131, the web 132 of which engages the outer surface 42 on the web 21 of the structural component 20 comprising the lower member 19. A leveling stanchion 133 is positioned between the flanges 134 and 135 of the channel member 131 and is secured to the lower member 19 conjointly with the channel member 131.

The leveling stanchion 133 is of generally U-shaped configuration with a pair of legs 136 and 138 diverging moderately upwardly from a base 139. A mounting tab 140 extends substantially at right angles outwardly from leg 136, and a similar mounting tab 141 extends outwardly from leg 138. A nut and bolt combination 142 extends through tab 141, web 132 of channel member 131 and the web 21 of lower member 19 to secure these elements at that location. Depending upon the location, a similar arrangement may be employed with respect to tab 140. However, when the desired location for the leveling stanchion 133 locates the tab 140 beneath the anchor 50, one may spot weld the tab 140 to the web 21 through web 132.

A barrel 143 having a threaded interior 144 may be secured through the base 139, and a leveling pin 145 is matingly received within the barrel 143. By providing a slot 146 in the top of the leveling pin 145 one can readily adjust the vertical position of the pin 145, and thereby achieve leveling of the wall 11, by the use of a screwdriver through registered access port 148 in web 21 and access port 149 in web 132.

As best seen in FIG. 7, the base 139 extends outwardly with respect to the legs and then downwardly to present positioning lips 150 and 151, one on each side of the base 139. The lower edge of the cover plate 130A is folded back on itself to form a hook 152 which engages lip 150, and the lower edge of the identical cover plate 130B presents a hook 153 which engages lip 151.

A plurality of releasable securing means 154 fasten the upper edge of the cover plates 130 to the respective flanges 134 and 135 of channel member 131. One highly acceptable approach is to employ a quick-connect variation of the speed nut. As shown in FIGS. 6 and 7, a spring clip 155 embracingly engages flange 135—one end portion 158 engages the outwardly directed surface 159 on flange 135, and the opposite end portion 160 engages the inwardly directed surface 161 on flange 135. To effect this disposition of the end portions, the spring clip 155 is folded back on itself such that the medial portion 162 thereof overlies end portion 160. The central area of the medial portion 162 is severed from the spring clip 155 along the three sides so that it presents a resilient finger 163 independently resilient of the remainder of the clip.

An aperture 164 pierces the finger 163 and presents: opposed cam surfaces 165A and 165B; opposed locking recesses 166A and 166B; and, opposed stops 168A and 168B. An aperture 169 in end portion 158, an aperture 170 in flange 135 and an aperture 171 in end portion 160 register with the aperture 164 in the finger 163.

A corresponding aperture 172 in the cover plate 130 will also register with apertures 169, 170 and 171 so that the stem portion 173 of a locking device 174 will penetrate all four apertures. The axially outermost end of the stem portion 173 presents a head portion 175 that is slotted, as at 176, to facilitate rotation of the device 174. The axially innermost end of the stem portion 173 presents opposed, lug-like followers 178A and 178B which will ride along the cam surfaces 165A and 165B and be received within the locking recesses 166A and 166B when the head portion 175 is turned to retain the cover plate 130. Counter-rotation of the head portion 175 releases the followers 178A and 178B so that the top of the appropriate cover plate 130 can be swung outwardly. Simultaneous manipulation of the hooks 152 or 153 downwardly (to the floor) and inwardly will release it from the corresponding lips 150 or 151 and the cover plate can thereby be readily removed.

Reference to FIG. 7 reveals that the legs 136 and 138 are haunched, as at 179, to provide passageways 180A and 180B between the legs and the opposite cover plates 130A and 130B which extend in the direction of the cover plates 130 to receive the utility cables.

Spline members 105 releasably secure the panel members 12 within the quadrilateral openings delineated by the frame. As represented in FIG. 1, a plurality of panel members 12 are employed in the basic run 14A. At the juncture between successive panel members a vertically oriented spline 105 is secured to the frame 11 such that the spline may be translated laterally of itself within the plane of that portion of the frame to which it is secured, selectively to engage or disengage the abutting panel members such as 12A and 12B and thereby releasably secure the panel members to the frame 11. The details of a preferred panel member and complete explanation of the cooperative interrelationship between the spline 105 and a wall panel 12 are detailed in my co-pending application, Ser. No. 728,423, filed contemporaneously herewith now U.S. Pat. No. 4,094,113.

Figure 10:
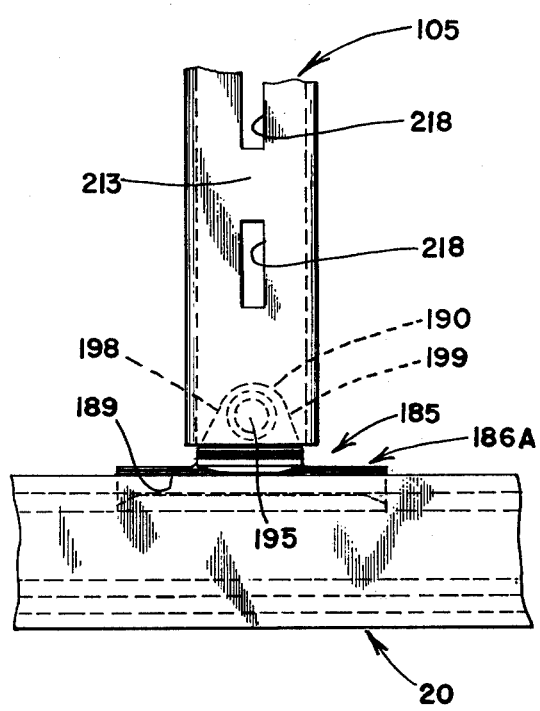
FIG. 10 is a side elevation of the structural arrangement depicted in FIG. 9.
Figure 9:
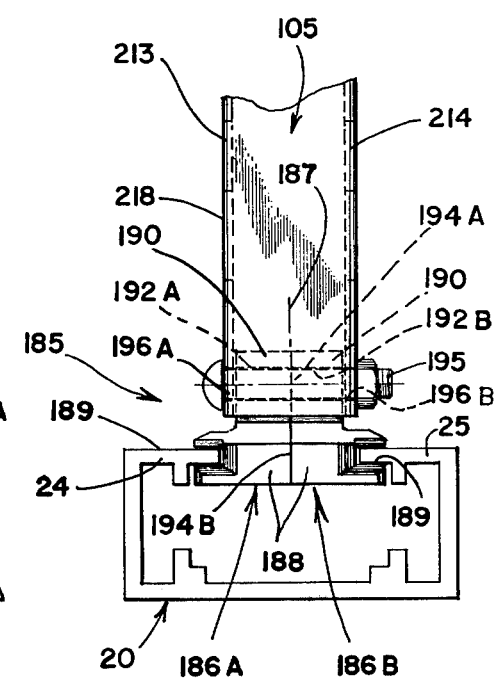
FIG. 9 is a cross section through a typical lower member which depicts a spline and the slide guide assembly by which said spline is supported from the upper and lower frame members, said slide guide assembly being represented in end elevation.

As best seen in FIG. 9, the spline 105 may preferably comprise a length of square tubing, each end of which is operatively connected to a slide guide assembly 185. Each slide guide assembly 185 is separable along a median plane 187 into a pair of identical, laterally juxtaposed slide blocks 186A and 186B. The slide blocks 186 are detailed in FIGS. 9 and 10 and each comprises a body portion 188 provided with a slideway 189 adapted to embrace an opposed flange 24 or 25 on the structural component 20. A lug 190 projects outwardly of the body portion 188 in a direction transverse with respect to the plane of the slideway 189, and a bore 192 extends through the lug 190 in a direction parallel to the plane of the slideway 189 but transversely with respect to the median plane 187.

Operatively positioning such slide blocks 186 on the structural component 20 requires that one block 186A is positioned so that the slideway 189 engages either flange, as depicted, flange 24. While holding block 186A in position a second block 186B is positioned so that the slideway 189 therein engages the opposite flange, as depicted, flange 25. It will be appreciated that in order to effect engagement of the slideway 189 on block 186B with flange 25 it is necessary that the two blocks be displaced longitudinally along the structural component 20. However, once the slideway on both blocks engages their respective flanges on the structural component 20, the blocks may be moved into lateral juxtaposition. The blocks 186 are so dimensioned that when juxtaposed, the opposing surfaces 194A and 194B are fully contiguous, thereby stabilizing the two blocks into an effectively unitary slide guide assembly 185.

A pivot pin 195 extends through the bores 192A and 192B, which register when the blocks 186A and 186B are fully juxtaposed, as well as corresponding bores 196A and 196B in the end portion of the spline 105. The pin 195 thereby retains the blocks 186 conjoined as a slide guide assembly 185 and also secures the spline 105 thereto.

A slide guide assembly 185 is provided in the lower member 19 as well as the top member 18 to stabilize the spline 105, and yet when the blocks 186 are made of a material such as nylon the assemblies 185 are freely slideable along the frame 11 to secure or release the wall panels 12, as desired.

The lugs 190 are each preferably tapered, as at 198 and 199, in order to assure relative pivotal movement of the spline about pivot pin 195. In this way the slide guide assemblies 185 will not bind to the top or lower members 18 and 19 in the event the spline 105 tends to cant with the application of a translatory force thereto.

A similar spline 200, as best seen in FIGS. 6 and 7, is also provided to operate in conjunction with the vertical support members 16. This spline may be channel-shaped, if desired, and if so, a positioning strap 201 provided across the open face in proximity to the lower end 202 thereof will engage behind the retaining flange 124 presented from the lower connector plug 110.

A vertically oriented slot 203 provided in the web portion 204 of the spline 200 in proximity to the upper end 205 thereof is adapted slidably to receive a bolt 206 by which to mount a release catch 208. The release catch 208 may be in the form of a Z-bar, the first end portion 209 of which is provided with a threaded bore 210 to receive the bolt 206. The medial portion 211 doglegs outwardly from the first end portion 209 and terminates in a second end portion 212 which serves as a catch tab to be selectively positionable behind the retaining flange 103 on the top connector block 85.

To position the spline 200 one loosens the bolt 206 in order that it may slide downwardly along slot 203, thus lowering the release catch 208 so that the catch tab portion 212 will clear the retaining flange 103 when the strap 201 is positioned behind the retaining flange 124 and the upper portion 205 of the spline 200 is swung between the opposed flanges 24 and 25 of the structural component 20 comprising the vertical support post 16. So positioned, the release catch 208 is raised until the catch tab portion 212 is received behind the retaining flange 108. The bolt 206 is then tightened to secure the release catch 208. The spline 200 is thereby operatively conjoined to the vertical support member 16.

The relative disposition of the catch tab portion 212 with respect to retaining flange 103 as well as the relative disposition of the positioning strap 201 with respect to the retaining flange 124 permits the spline 200 to be fully retracted between the opposed flanges 24 and 25 and into the guideway 35 and also to be sufficiently protracted cooperatively to engage, and thereby retain, a panel member 12, as is detailed in my aforesaid U.S. Pat. No. 4,094,113.

It will be observed that the side walls 213 and 214 on spline 105 as well as the side walls 215 and 216 on spline 200 are provided with a plurality of vertically aligned, slotted apertures 218. The apertures 218 provide a facile means by which to hang appurtenances to the wall 10, one unique configuration for a failsafe hanging bracket being disclosed in my co-pending application, Ser. No. 728,432, also filed contemporaneously herewith now U.S. Pat. No. 4,048,768.

In addition, the slotted apertures 218 also provide a means by which the blade of an assembly tool can engage the spline 105 or 200 in order to effect translational movement thereof within the plane of that portion of the wall within which the spline is located. When the spline 105 is retracted within a plane wall 12 having a resilient edge portion, such as disclosed in my said U.S. Pat. No. 4,094,113, the resilience of the edge permits access to the slotted apertures by the blade of an assembly tool. However, in that situation where the spline 200 is retracted within a vertical support member 16, the fit between the side walls 215 and 216 of the spline 200 and the adjacent edges of the flanges 24 and 25 is too close to permit insertion of an assembly tool blade. Accordingly, access ports 219 and 220 (FIG. 5) are recessed into the upper and lower edges of flanges 24 and 25, respectively.

Figure 12:
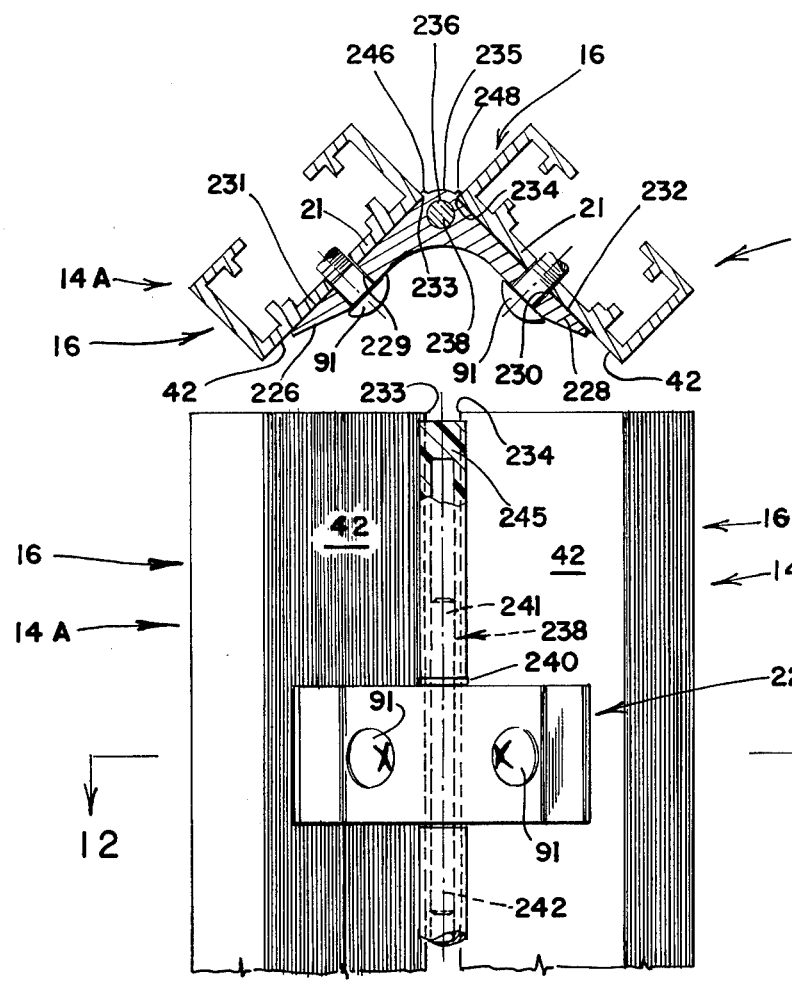
FIG. 12 is a transverse section taken substantially along line 12—12 of FIG. 11.
Figure 11:
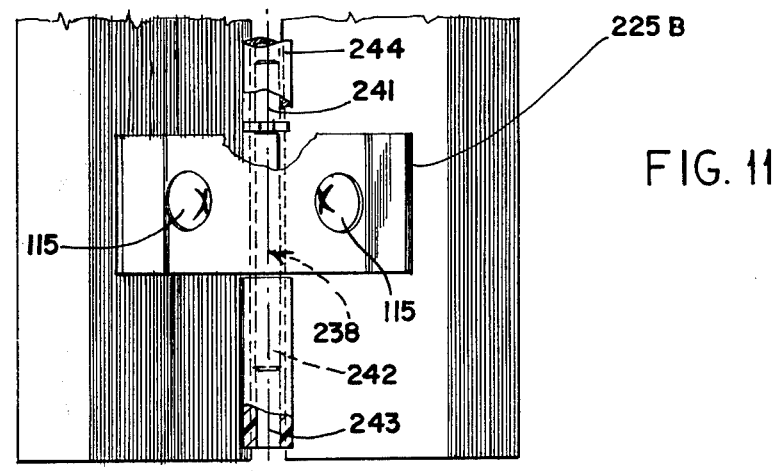
FIG. 11 is a diagonal elevation depicting one embodiment of the bracket arrangement by which two adjacent, vertical support members can be joined and the space therebetween closed to view.

With reference again to FIG. 1, lateral run 14B extends outwardly from run 14A at modular junction 15A. FIGS. 11 and 12 detail the construction of such a junction, hereinafter referred to as a two-way junction. A two-way junction could extend the two runs at any predetermined angle although such a junction will normally extend the two runs at right angles. In any event, the angle at which the runs extend in controlled by the angularity of the identical upper and lower connecting brackets 225A and 225B, respectively. In the representative bracket 225A depicted in FIGS. 11 and 12 the arms 226 and 228 are disposed at right angles and that denominates the angularity of the bracket.

Each arm 226 and 228 is provided with a bore 229 and 230, respectively, that is disposed transversely through the medial portion of the arm.

The outer surface 231 of arm 226 engages the outer surface 42 on web 21 of the structural component comprising the vertical support member 16 at the end of run 14A, and the outer surface 232 of arm 228 engages the outer surface 42 on web 21 of the structural component 20 comprising the vertical support member 16 at the adjacent end of run 14B. The nut and bolt combination 91 which extends through the registered bores 92 and 93 (provided in the web 21 of structural member 20 and the web wall 89 of top connector plug 85, respectively, as shown in FIG. 6) in each vertical support member is secured through the corresponding bore 229 and 230 in the appropriate arm 226 and 228 of the connecting bracket 225A. The nut and bolt combinations 115 which extend through the registered bores 113 and 114 (provided in the web wall 112 of the lower connector plug 110 and the web 21 of the structural member 20, respectively, as is also shown in FIG. 6) in each vertical support member 16 is connected to the corresponding bore 229 and 230 in the appropriate arm 226 and 228 of the connecting bracket 225B.

Figure 14:
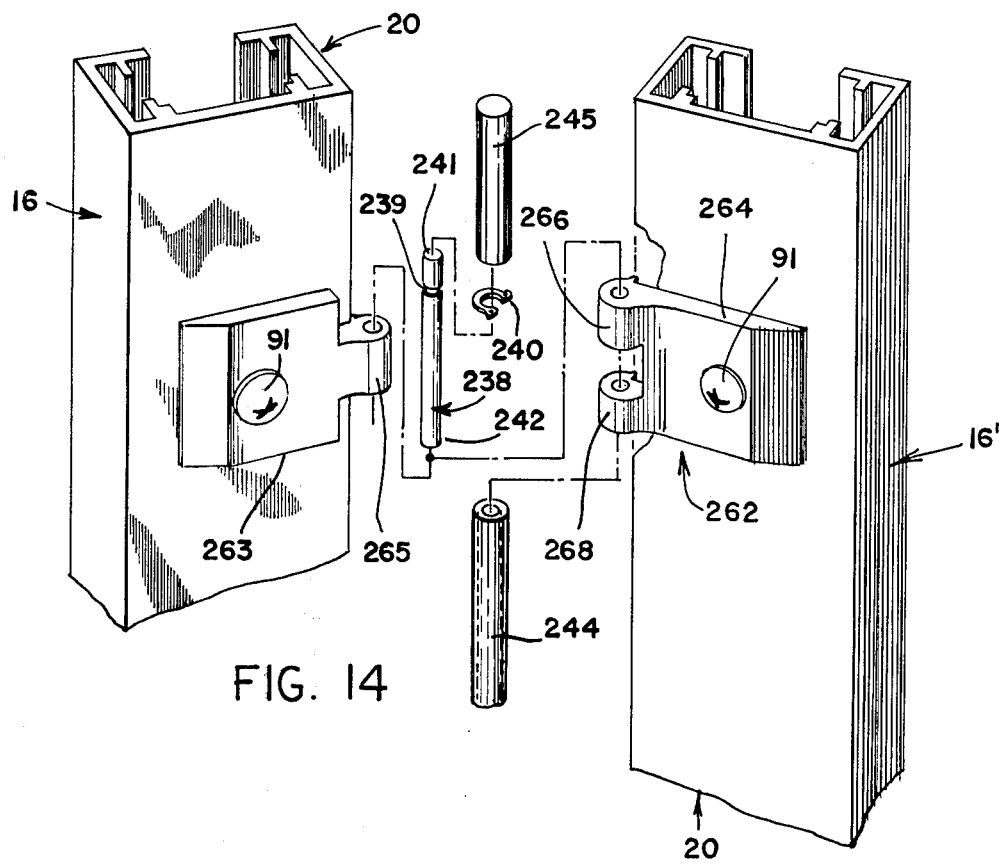
FIG. 14 is an exploded perspective, partly broken away, depicting a third embodiment of a bracket arrangement by which two adjacent vertical support members can be joined at selective angular dispositions, FIG. 14 appearing on the same sheet of drawings as FIG. 8.

In a two-way connection, there is a resulting space which exists between the adjacent corners 233 and 234 of the vertical support member 16 at the adjacent ends of the runs 14A and 14B. For privacy as well as aesthetics the space can be readily closed, as depicted in FIG. 11. That is, the corner portion 235 of each bracket 225 is provided with a bore 236 that extends axially of the bracket. A pin 238—the details of which are best seen in FIG. 14—is then received in the bore 236 through each bracket 225. Each pin 238 has an annular groove 239 in which a ring clip 240 is received. The ring clip 240 rests on the upwardly directed surface of the appropriate bracket 225, and the annular groove 239 is located so that a portion 241 of the pin 238 extends upwardly and a portion 242 downwardly with respect to the bracket in which the pin is received.

Tubular fillers are retained by the pins 238 to block the space between corners 233 and 234. At junction 15A, for example, when two brackets 225A and 225B are employed a complete closure of the space can be effected by the use of three tubular fillers. The lowermost filler 243 is received over and retained in position by the downwardly directed portion 242 of the pin 238 in lower bracket 225B. This closes the space between the bracket 225B and the floor; and it may well be necessary to locate the filler 243 in position and then insert the pin 238 through the bracket 225B and into the filler 243.

A medial filler 244 is positioned between the upper and lower brackets 225A and 225B. With the pin 238 received in bracket 225B, the filler 244 is positioned over the upwardly directed portion 241 thereof, and with the filler 244 properly oriented a pin 238 is inserted through the upper bracket 225A so that the downwardly directed portion 242 of that pin is received within the medial filler 244.

A capped filler 245 is then positioned over the upwardly directed portion 241 of the pin 238 received in bracket 225A, and the space between the corners 233 and 234 is filled. If the particular wall 10 would be of such a height that more than two brackets 225 would be deemed desirable, additional tubular fillers would be applied in the same manner from bracket-to-bracket successively up the vertical support member 16.

To facilitate field assembly and assure that the successive brackets 225 will be aligned in conformity with the vertical disposition of the support members 16 to which they are secured—a result that is desired aesthetically and required if the successive pins 238 and fillers 243, 244 and 245 are to interfit—an orienting ridge 246 extends along arm 226, parallel to, and adjacent, the corner, or apex, 235 of bracket 225, and a similar orienting ridge 248 extends along arm 228, parallel to, and adjacent the corner, or apex, 235 of bracket 225. Ridge 246 engages corner 233 and ridge 248 engages corner 234. This engagement provides a ready assurance as to the disposition of the bracket and also precludes undesirable canting of the bracket 225 as the nut and bolt combinations 91 and 115 are tightened.

Consistent with the aesthetic considerations heretofore mentioned, the apex of each bracket 225 may be of cylindroidal configuration, as at 235, the radius of said cylindroidal configuration being equal to the common radius of the successive fillers 243, 244 and 245.

Figure 13:
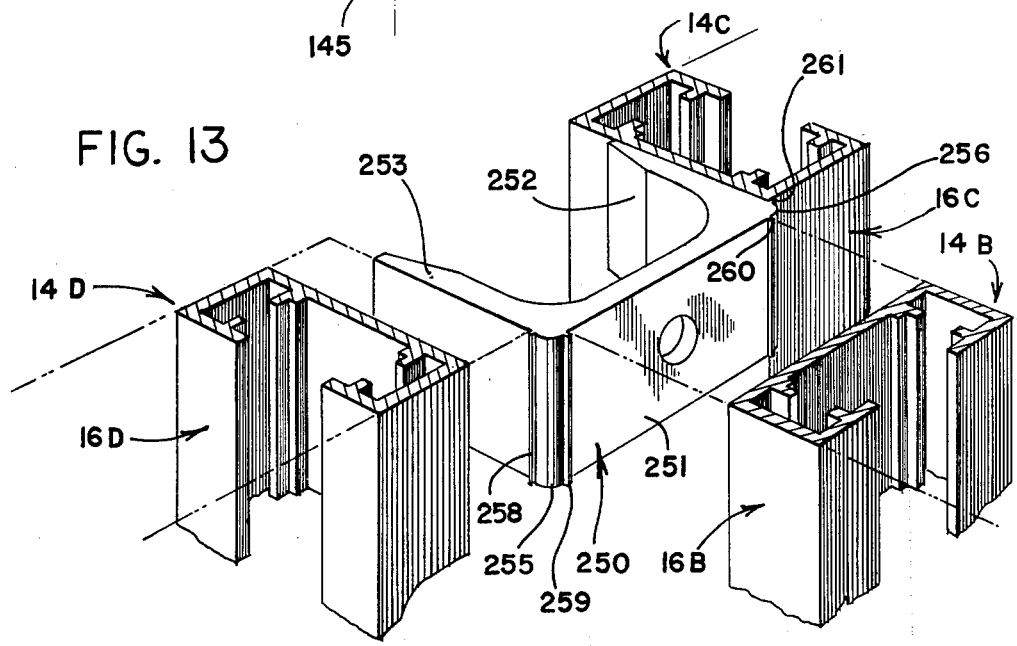
FIG. 13 is a perspective depicting a second embodiment of a bracket arrangement by which three adjacent vertical support members can be joined, said view taken substantially on line 13—13 of FIG. 1 and rotated 180° about a vertical axis, FIG. 13 appearing on the same sheet of drawings as FIG. 7.

For a three-way junction, as represented as 15B in FIG. 1 and schematically detailed in FIG. 13, the brackets 250 may be of channel-shaped configuration—the vertical support member 16B at the end of run 14B being secured in a similar fashion to the web 251 of bracket 250; the vertical support member 16C at the end of run 14C being secured to flange 252 of bracket 250; and, the vertical support member 16D at the end of run 14D being secured to flange 253 of bracket 250. Here, too, fillers (not shown) may be employed to block the space between the adjacent corners of the juxtaposed vertical support members 16 at the end of each run; the apices 255 and 256 of each bracket 250 may also be cylindroidally curved; aligning ridges 258 and 259 are also preferably employed, one on each side of apex 255, as are aligning ridges 260 and 261, one on each side of apex 256.

It may also be desirable to employ a hinged connection 262 which allows for varying the angle of two runs at will. This concept generally duplicates the two-way juncture except, as shown in FIG. 14, a first hinge strap 263 is connected to one vertical support member 16 by nut and bolt combination 91 in that support member, and a second hinged strap 264 is connected to the adjacent vertical support member 16' of the adjacent run by similar nut and bolt combinations 91. The two hinge straps 263 and 264 need differ only by the location of the eyes in order that they may properly interfit. And, because only modest stresses would be anticipated, the hinge straps may also differ by the number of eyes on each hinge. As depicted, hinge strap 263 need only have one eye 265, and hinge strap 264 need only have two eyes 266 and 268.

The eyes 265, 266 and 268 are generally cylindrical and thereby comport to the cylindrical configuration of the intermediate and cap fillers 244 and 245, a more detailed description of which is given in conjunction with FIGS. 11 and 12.

The pin 238 is received through bores 270, 271 and 273 in eyes 265, 266 and 268, respectively, to serve not only to retain the fillers 244 and 245 but also as the hinge pin itself.

The single eye 265 will preferably be provided with an orienting ridge 292, and the eyes 266 and 268 will be provided with orienting ridges 293 and 294, respectively, for the same purposes that corresponding ridges are provided on junction brackets 225 and 250.

Figure 15:
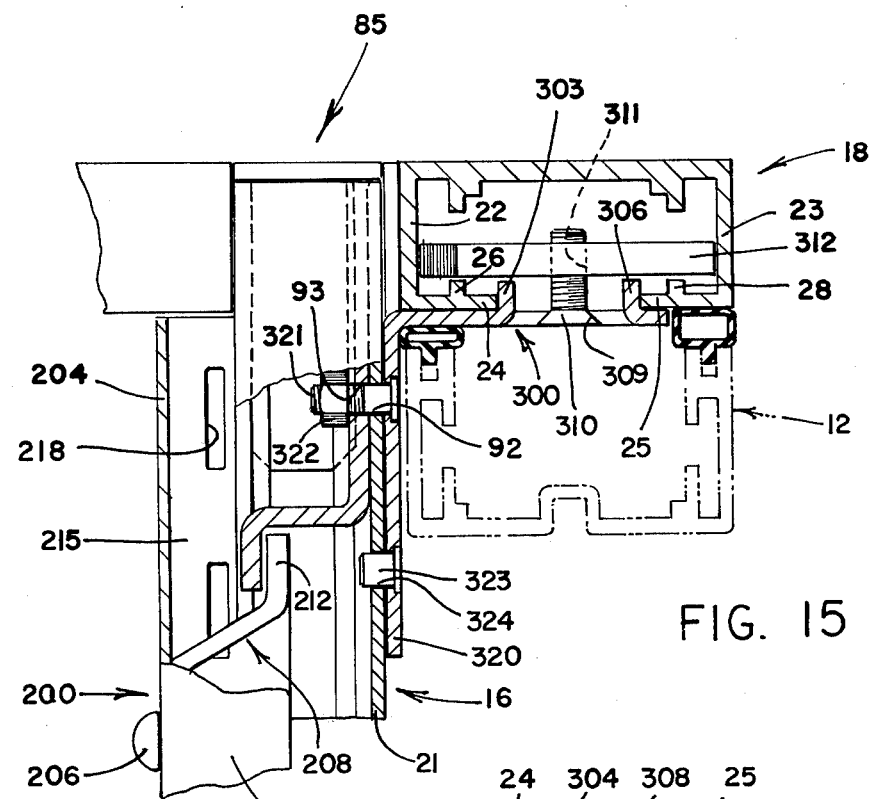
FIG. 15 is a vertical section, partly broken away, depicting the use of a lock slide by which a junction for a lateral run-off may be effected at any location between vertical support members.
Figure 16:
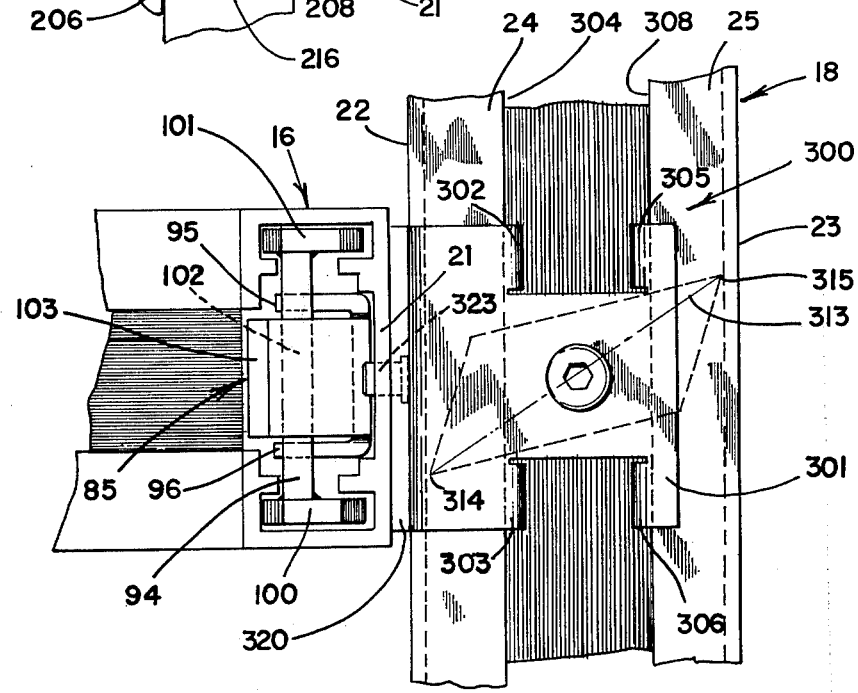
FIG. 16 is a bottom plan of the lock slide junction depicted in FIG. 15.

The junctions heretofore described are locatable only at modular distances because they require an interconnection between two or more adjacent vertical support members. However, the concept of the present invention also provides a novel means by which a lateral junction may be effected at any location horizontally between successive vertical support members. The basic component for such a connection is a lock slide 300, the structural details of which are depicted in FIGS. 15 and 16.

The lock slide 300 serves releasably to interconnect a vertical support member 16 to the top member 18 and to the lower member 19 at any desired location between successive vertical support members 16. Because the lock slide 300 which interconnects the vertical support member of the lateral run to the lower member 19 may be identical to the lock slide which interconnects the vertical support member 16 to the top member 18, the lock slide 300 is depicted only in conjunction with the top member 18.

The lock slide 300 has a base plate 301 that is received between a panel 12 and the top member 18. The base plate 301 fully engages the flange on that side of the top member 18 from which the lateral wall is to extend. As depicted, the base plate 301 fully engages flange 24, spans the distance between the flanges 24 and 25 and engages a portion of the opposed flange 25.

Spaced fingers 302 and 303 extend transversely outwardly from the base plate 301 to engage the longitudinal edge 304 of flange 24. Similarly, spaced fingers 305 and 306 extend transversely outwardly from the base plate 301 to engage the longitudinal edge 308 of flange 25.

A tapered bore 309 is located in the medial portion of the base plate 301 and rotatably receives a flat head machine screw 310. The screw 310 matingly engages a threaded bore 311 in the medial portion of a lock bar 312 that is preferably in the shape of a parallelogram the major diagonal 313 of which is of greater span than the dimension between the lateral side walls 22 and 23 of the top member 18. With the lock bar 312 oriented as represented in FIG. 16, tightening the screw 310 initially brings the acutely angled corners 314 and 315 into engagement with the side walls 22 and 23, respectively, so that continued tightening of the screw 310 brings the lock bar 312 firmly into engagement with the ribs 26 and 28 firmly to secure the base plate 301 against the opposed flanges 24 and 25.

The fingers 302, 303, 305 and 306 prevent any rotation of the base plate 301 in response to the tightening of the screw 310 and thereby assure the transverse disposition of the base plate 301 with respect to top member 18. However, as can be seen in FIG. 15, it is preferable that the fingers do not extend inwardly of the structural component 20 a distance greater than the distance to which the ribs 26 and 28 extend in order to obviate interference between the lock member 312 and the fingers during either tightening or loosening of the lock bar.

The foregoing arrangement permits facile interconnection of a lock slide 300 to the upper and lower members 18 and 19, respectively, of the frame at any desired location therealong.

Extending perpendicularly from the outermost end of the base plate is a coupling plate 320. The coupling plate 320 has at least one threaded stud 321 which extends outwardly of the coupling plate and is located such that it will be properly received through registered bores 92 and 93 provided in the web 21 of the structural component 20 comprising vertical support member 16 and the web wall 89 of the top connector plug 85, respectively. A nut 322 tightened on threaded stud 321 secures the vertical support member 16 to the lock slide 300 and so secured a wall frame may be extended outwardly from that vertical support member 16.

It has been found generally desirable to provide a second, stabilizing stud 323 which also extends outwardly from the coupling plate 320 in a direction parallel with the threaded stud 321. The second stud 323 is received in a bore 324 provided in the web 21 of the vertical support member 16. The length of the second stud 323 should be limited in order to preclude interference between the stud 323 and the catch tab portion 213 on the release catch 208 when the spline 200 is retracted inwardly of the vertical support member 16.

Figure 19:
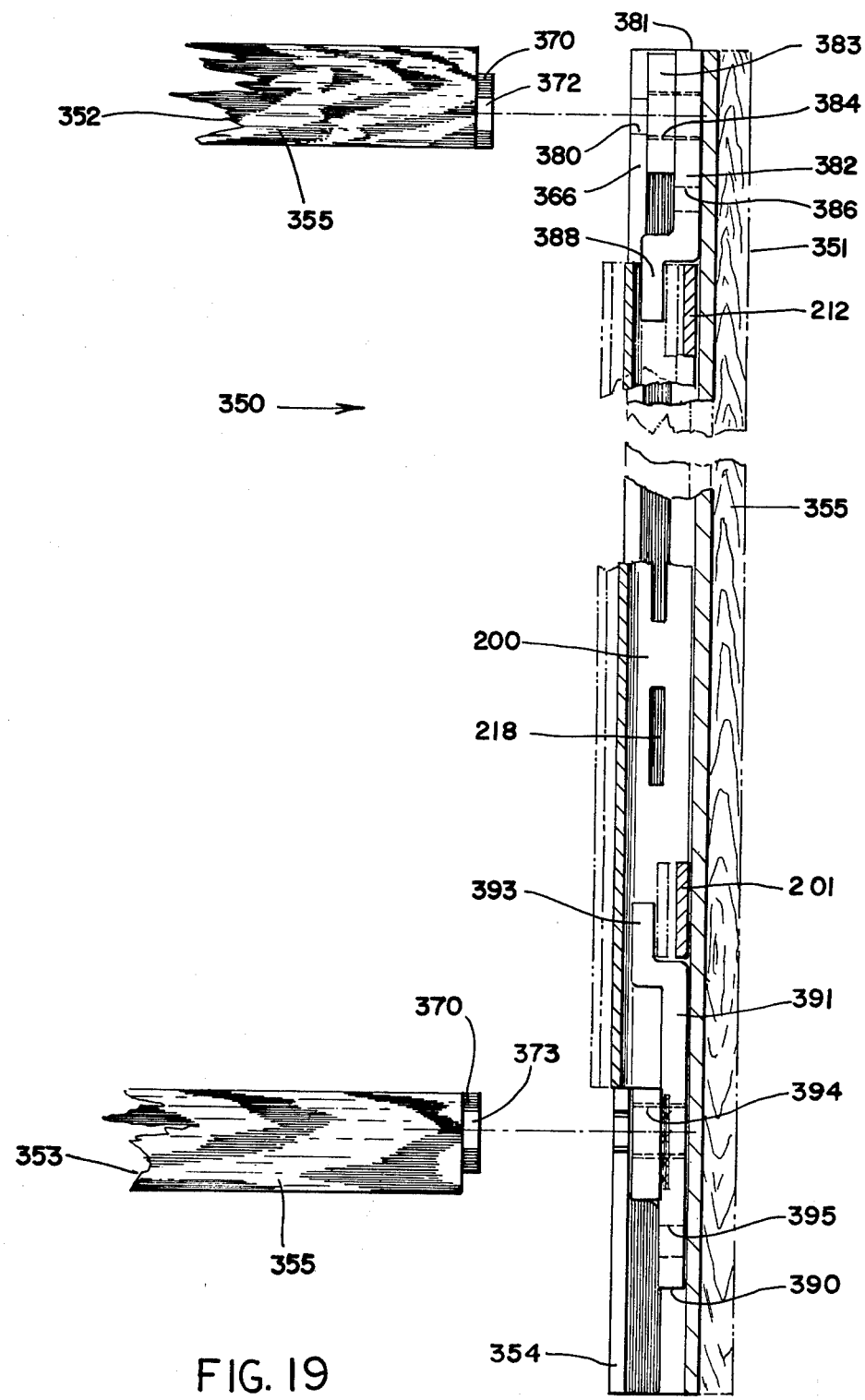

With reference now to FIGS. 17–19, an alternative wall frame, indicated generally by the numeral 350, which presents a wooden surface shall be described. The frame 350 comprises a plurality of horizontally spaced, vertical support members 351, as well as parallel, horizontally oriented upper and lower members, 352 and 353, respectively.

Each of the members 351–353 includes a structural component 354 of common configuration, which in final assembly is totally hidden by a wooden fascia 355 also of common configuration. The cross section of structural component 354 and the wooden fascia 355, is best depicted in FIG. 17. As will be readily understood, the component 354 may well be extruded and will provide the main support for the frame 350, while the purpose of the fascia 355, which is easily cut to conform to the exterior of the structural component 354, is primarily aesthetic rather than structural, it being the preference of some individuals to have a particular type of wood frame exposed rather than metal. The wooden member 355 is readily affixed to the structural component 354 via nuts and bolts (not shown). The bolt heads are preferably countersunk and the overlying holes plugged, so that no indication of fastening means is exposed on any external wood surface.

The structural component 354 has three channels, the first of which 356 is formed by a web 358, and parallel sides 359 and 360 extending outwardly from the horizontal edges thereof. Bases 361 and 362 extend horizontally away from the sides 359 and 360 respectively and have parallel sides 363 and 364 extending outwardly from their respective edges, which in turn terminate in opposed flanges 365 and 366, parallel to the bases 361 and 362, to form diametrically opposed second and third channels 368 and 369, respectively.

Interconnection of the structural members 354 is facilitated by the use of an anchor 370 having a central body 371 and two legs 372 and 373 extending outwardly therefrom. As is clearly seen in upper frame component 352, (FIG. 17) the body 371 and legs 372–373 of connector 370 matingly engage the channels 356, 368 and 369. An upper surface 374 of the body 371 lies in a plane common with the flanges 365 and 366 of the structural component 354 and the edges 375 and 376 of the wooden fascia 355. A longitudinally extending bore 377 passes through the body of anchor 370 for receipt of a fastening bolt 378. In use, an anchor 370 is positioned at each end of structural components 354 intended for use in horizontal position, extending beyond the edges thereof a short distance equivalent to the thickness of opposed flanges 365 and 366. The connector is then immovably affixed to the structural members in this position via suitable means such as welding.

Toward the ends of structural components 354, intended for use in vertical position, a notch 379 is cut from the flange 365 and a notch 380 is cut from the flange 366 for receipt of legs 373 and 372, respectively, from the anchor 370 when the horizontal and vertical structural components 354 are connected.

A connector plug 381, somewhat similar in function to the connector plug 85 described in conjunction with the frame 11, hereinabove, is employed in the vertical structural components 354, having a twofold purpose as shall become apparent. The connector plug 381 includes an elongated base 382 which slidably engages the channel 356 in structural component 354. At one end of the plug 381 is affixed a cross plate 383 the lateral sides of which slidingly engage the channels 368 and 369. A threaded bore 384, through the medial portion of cross plate 383 on plug 381, is provided for receipt of the bolt 378 passing through the bore 377 in anchor 370. A second bore 386 is provided in the base 382 for fastening of the plug 381 to the member 354 with the bolt affixing the wooden member 355 to the structural component 354 (similar to nut and bolt combination 91 in FIG. 6). Thus, to assemble an upper horizontal structural component 354 to a vertical structural component 354, a bolt is passed through the anchor 370 and is drawn tightly into the connector plug 381 forming a rigid 90° joint. Downward movement of the upper horizontal structural component 354 is prohibited by the interlocking of legs 372 and 373 with notches 379 and 380. A wooden cap member 385 is affixed to the top of the vertical wooden frame 355 to enclose the internal components, primarily for appearance.

At the end opposite the cross plate 383, the base 382 of connector plug 381 forms an offset leg 388 which is generally parallel to the base 382 and lies in the same plane as the cross plate 383, as depicted in FIG. 19. Purpose of the offset leg 388 is to engage the catch tab 212 of the spline 200, described hereinabove in conjunction with the frame 11, and to allow for the removal of the spline 200 from the structural component 354. It will be seen in FIG. 17 that the release catch 208 operates in the same manner as first described with reference to FIG. 6. The spline 200 fits within the channel 356 of the structural component 354 and is fully retractable therein for the removal of a panel member 12, as is detailed in my aforesaid U.S. Pat. No. 4,094,113.

At the lower end of a vertical structural component 354 is employed a similar connector bar 390, depicted in FIG. 18, and comprising an elongate base 391, medially positioned cross plate 392, and offset leg 393. The base 391 slidably engages the channel 356, while the cross plate 392 slidably engages the channels 368 and 369. A threaded bore 394 is provided in the cross plate 392 and base 391 for receipt of a bolt (not shown) passing through an anchor 370 carried by a lower horizontal structural component 354. A second bore 395 is provided in base 391 for the connection thereof to the component 354 with the bolt which also affixes the wooden member 355 to the structural component (354 (similar to nut and bolt combination 115 in FIG. 6). Connection of a lower horizontal and vertical structural component is identical to the manner by which the upper horizontal component is attached, as was described in conjunction with FIG. 17. As depicted in FIG. 19, the lower horizontal frame 353 is displaced sufficiently upwardly from the floor to accommodate a suitable base assembly (not shown).

The positioning strap 201 of spline 200 engages the offset leg 393 of connector bar 390 and, together with the tab portion 212 of release catch 208 on spline 200 which engages the offset leg 388 of the upper connector plug 370, controls the extent to which the spline may be protracted. In order to protract and retract the spline 200 with respect to the vertical structural components 354, access ports 396 and 398 are recessed into the edges of flanges 365 and 366 at the top (FIG. 17) and near the bottom (not shown). Thus, once assembled, the frame 350 permits the facile insertion and removal of panel members 12 in the same manner as with respect to the frame 11.

It should now be apparent that a frame construction embodying the concept of the present invention is readily adapted to provide a free-standing, pre-fabricated, knockdown, readily relocatable wall or space divider by use of a basic structural component common to the horizontal as well as the vertical members which is readily interconnectable along a common axis or at right angles with respect to each other and which otherwise accomplishes the objects of the invention.

I claim:

1. At least two frames for a free-standing, vertical divider wall, each frame comprising a plurality of structural components having a generally C-shaped cross-section with a planar web having longitudinal edges, generally parallel sidewalls extending from the longitudinal edges of the web and terminating in opposed, coplanar, inwardly extending flanges, a medial cavity extending longitudinally of each said structural component and opening between said opposed flanges; at least two of said structural components in each frame being horizontally spaced and disposed as vertical support members; at least two of said structural components in each frame being horizontally disposed and vertically spaced as top and lower members; means in each frame to conjoin said top and lower members to said vertical support members in order to delineate a quadrilateral panel receiving locus; said structural components being arranged such that the opposed flanges are disposed facing the quadrilateral receiving locus to define the outer perimeter of said receiving locus, and said webs define the outer perimeter of each frame; wall panel means being removably received in said quadrilateral receiving locus; the outer dimensions of said wall panel means being substantially equal to the corresponding dimensions of said quadrilateral receiving locus and said wall panel means comprising two, opposed planar faces, a pair of vertical side edge surfaces, a top edge surface and a bottom edge surface; said vertical side edge surfaces, top edge surface and bottom edge surface being in abutting relationship with said opposed flanges to permit said wall panel means removably to be received within said quadrilateral receiving locus; one vertical support member in a first frame being located adjacent a run of said top and lower members and between successive vertical members in the second frame; at least one lock slide; said lock slide having a base plate selectively positionable along at least one of said horizontally disposed members of said second frame and received between said horizontally disposed structural component and said wall panel to engage said opposed flanges on said horizontally disposed structural member; means extending within said medial cavity to secure said base plate to said horizontally disposed structural component at the selected location; said lock slide also having a coupling plate; means to secure said coupling plate to the web of said vertical support member in said first frame located laterally adjacent the horizontal in said second frame to which the base plate of said lock slide is secured.

2. At least two frames, as set forth in claim 1, in which the opposed flanges have longitudinal edges; finger means being presented transversely from said base plate to engage said longitudinal edges and thereby assure the transverse disposition of the base plate with respect to the structural component to which said base plate is secured.

3. At least two frames, as set forth in claim 2, in which the means to secure said base plate to the appropriate structural component comprises: a lock bar received within the medial cavity in said structural component; tightening means disposed between said base plate and said lock bar to draw said components together and thereby grip the opposed flanges therebetween.

4. At least two frames, as set forth in claim 3, in which at least one stud is presented from said coupling plate; said stud being received through the web of said vertical support member; and means received within the medial cavity to lock said web to said stud.

5. At least two frames, as set forth in claim 4, in which a second stud is presented from said coupling plate; said second stud also being received through the web of said vertical support member.

* * * * *

UNITED STATES PATENT AND TRADEMARK OFFICE
CERTIFICATE OF CORRECTION

PATENT NO. : 4,204,375
DATED : May 27, 1980
INVENTOR(S) : Wayne W. Good

It is certified that error appears in the above-identified patent and that said Letters Patent are hereby corrected as shown below:

Column 1, line 36, "standarized" should read --standardized--.

Column 11, line 57, "plane" should read --panel--.

Column 12, line 8, "in" should read --is--.

Column 15, line 27, "213" should read --212--.

Column 17, line 5, "(354" should read --354--.

Column 18, line 29, after "horizontal" insert --member--.

Signed and Sealed this

Tenth Day of February 1981

[SEAL]

Attest:

RENE D. TEGTMEYER

Attesting Officer

Acting Commissioner of Patents and Trademarks